United States Patent
Arnell

(10) Patent No.: US 10,293,342 B2
(45) Date of Patent: May 21, 2019

(54) VEHICLE SYSTEM AND METHOD

(71) Applicant: HELIX ENERGY SOLUTIONS GROUP, INC., Houston, TX (US)

(72) Inventor: Michael John Arnell, Ellon (GB)

(73) Assignee: Helix Energy Solutions Group, Inc., Houston, TX (US)

( * ) Notice: Subject to any disclaimer, the term of this patent is extended or adjusted under 35 U.S.C. 154(b) by 434 days.

(21) Appl. No.: 14/979,164

(22) Filed: Dec. 22, 2015

(65) Prior Publication Data

US 2016/0175847 A1   Jun. 23, 2016

Related U.S. Application Data

(60) Provisional application No. 62/095,762, filed on Dec. 22, 2014.

(51) Int. Cl.
| | |
|---|---|
| *E02F 7/00* | (2006.01) |
| *B02C 4/28* | (2006.01) |
| *B02C 21/02* | (2006.01) |
| *B02C 4/08* | (2006.01) |
| *E02F 7/06* | (2006.01) |
| *F16L 1/16* | (2006.01) |

(52) U.S. Cl.
CPC ............ *B02C 4/286* (2013.01); *B02C 4/08* (2013.01); *B02C 21/026* (2013.01); *E02F 7/065* (2013.01); *E02F 7/00* (2013.01); *F16L 1/166* (2013.01)

(58) Field of Classification Search
CPC ............................................... E02F 7/00
USPC .... 299/7–9, 18; 37/307, 313, 314, 319, 326, 37/329, 337, 343
See application file for complete search history.

(56) References Cited

U.S. PATENT DOCUMENTS

| | | | | |
|---|---|---|---|---|
| 4,045,086 | A | * | 8/1977 | Parkes .................... E21C 25/60 241/186.35 |
| 4,232,903 | A | * | 11/1980 | Welling ................ E02F 3/8858 299/8 |
| 4,280,288 | A | * | 7/1981 | Corfa ..................... E02F 5/006 37/308 |
| 5,471,771 | A | | 12/1995 | Gilbert |
| 2003/0121182 | A1 | | 7/2003 | Jacobsen et al. |
| 2007/0253780 | A1 | | 11/2007 | Pihl |
| 2008/0092411 | A1 | | 4/2008 | Guth et al. |

(Continued)

FOREIGN PATENT DOCUMENTS

| | | | |
|---|---|---|---|
| GB | 2486014 A | * | 1/2012 |
| JP | 06049832 | | 2/1994 |

OTHER PUBLICATIONS

Bae, Geun, PCT Search Report for PCT Application No. PCT/US2015/067495 dated Apr. 1, 2016.

(Continued)

*Primary Examiner* — Sunil Singh
(74) *Attorney, Agent, or Firm* — Locke Lord LLP

(57) ABSTRACT

A vehicle and method of use in subsea operations related to crushing concrete mattresses including at least one lift assembly, at least one crushing roller, at least one blow out pipe cable of blowing crushed concrete mattress fragments into a rubble container. In a preferred embodiment, the vehicle has at least one fork lift connected to the lift assembly, a digger chain assembly arrangement, treads, an interface connected to the vehicle and capable of engaging the rubble container, and each rubble container is detachable from the interface.

13 Claims, 4 Drawing Sheets

(56) References Cited

U.S. PATENT DOCUMENTS

2013/0241263 A1* 9/2013 Jones ..................... E02F 3/18
                                                    299/9
2013/0298430 A1* 11/2013 Jones ..................... E02F 3/20
                                                    37/313

OTHER PUBLICATIONS

Bae, Geun, PCT Written Opinion for PCT Application No. PCT/US2015/067495 dated Apr. 1, 2016.

* cited by examiner

US 10,293,342 B2

VEHICLE SYSTEM AND METHOD

CROSS REFERENCE TO RELATED APPLICATIONS

This nonprovisional application for patent claims priority to, and hereby incorporates by reference, U.S. Provisional Application Ser. No. 62/095,762, entitled "Vehicle System and Method," filed Dec. 22, 2014.

BACKGROUND OF THE INVENTION

Technical Field of Invention

The invention disclosed and taught herein relates generally to a system and method for use of a vehicle for use in environments such as but not limited to subsea environments.

Background of the Invention

Pipeline support and stabilization mattresses have been used in subsea operations. There have been various designs over the years. For example, some of the early designs used large canvas bags that included materials such as bituminous material mixed with aggregates. There were issues with these designs. For example, when these mattresses were left of the deck of a vessel, they were prone to softening and the heat from the engine rooms or exposure of sunlight could affect the shape of the mattresses. Once installed in subsea locations, the mattresses could become brittle, crack, and become stiff enough to not properly lay on the pipeline or spool they were installed over. This could lead to accidents related to moving or lifting the mattresses.

Subsequently, concrete mattresses were introduced. These concrete mattresses were referred to as link-lok mattresses. These mattresses were usually a sheet of premade plastic pots connected together by rope. The plastic pots contained cured concrete. This allowed for easier transportation of the pots to a remote location before the filling and the curing of the concrete in the pots. Unfortunately, this method proved to be expensive. Additionally, it became impractical to revert to the bituminous type mattresses due to new regulations.

Accordingly, a new method was introduced that installed and positioned mold produced concrete mattresses with either installation frame, beam, or speedloader frames. In this configuration, mattresses have to be installed and repositioned individually. This is advantageous because the frame can carry three to five mattresses. Moreover, this method requires a diver and a remotely operable vehicle ("ROV") to deploy the mattresses.

These methods include recovery by frame or beam. In this method, mattresses are either recovered to the surface one at a time using either the lifting beam or frame wherein the rigging is connected either by divers or ROV intervention. Alternatively, a small number of concrete mattresses are loaded onto speedloaders at the seafloor and then lifted to the surface for re-use or disposal.

Another method is recovery by subsea modified skip or half-height. In this method, the mattresses must be individually rigged by diver or ROV at the seafloor using the frame/beam method described above, then lifted and placed into a modified half height container, which in turn must then be lifted to the surface via surface vessel or platform deck crane.

Another method is recovery by steel wire rope nets or custom flat-racks. This method is a variation/alternative to the speedloader method described above, where by a number of mattresses are loaded subsea one at a time onto either out-spread steel cargo nets or flat-racks using the diver or ROV rigged frame/beam method and then the nets/flat racks are lifted to the surface via the vessel/platform deck crane.

Another method is recovery by hydraulic grapple connected to vessel/platform deck crane. In this method, mattresses are lifted individually by large hydraulic grapple, subsea which partially crushes the mattress structure and the load is recovered to the vessel/platform deck.

There are issues with each of these methods. For example, recovery of mattresses through the splash zone using the integral polypropylene rope loops are not recommended due to concerns regarding the integrity of the loops prior to attempting the lift.

Similarly any method which relies on the interaction of divers to complete the mattress lifting or positioning activity, including guiding and orientating the suspended mattresses in the half heights subsea, may be considered as a high risk activity.

Moreover, when subsea half heights/containers are used, the total lift loads may be difficult to establish and there also may be high seabed suction loads. The method is also difficult for high volumes of mattress recovery because of the number of containers required and the amount of space required on the vessel deck.

Furthermore, the use of the grapple to lift mattresses may be dangerous to personnel on the vessel deck as the load in recovered and there is a chance of snagging the underlying umbilical or pipeline as the mattress is grabbed and lifted from the seabed.

Therefore, a need exists to develop a recovery vehicle the can provide improvements over these systems when used.

SUMMARY OF THE INVENTION

The present invention relates to a vehicle and method of use in subsea operations related to crushing concrete mattresses including at least one lift assembly, at least one crushing roller, at least one blow out pipe cable of blowing crushed concrete mattress fragments into a rubble container. In a preferred embodiment, the vehicle has at least one fork lift connected to the lift assembly, a digger chain assembly arrangement, treads, an interface connected to the vehicle and capable of engaging the rubble container, and each rubble container is detachable from the interface.

DESCRIPTION OF THE DISCLOSED EMBODIMENTS

Figure 1:
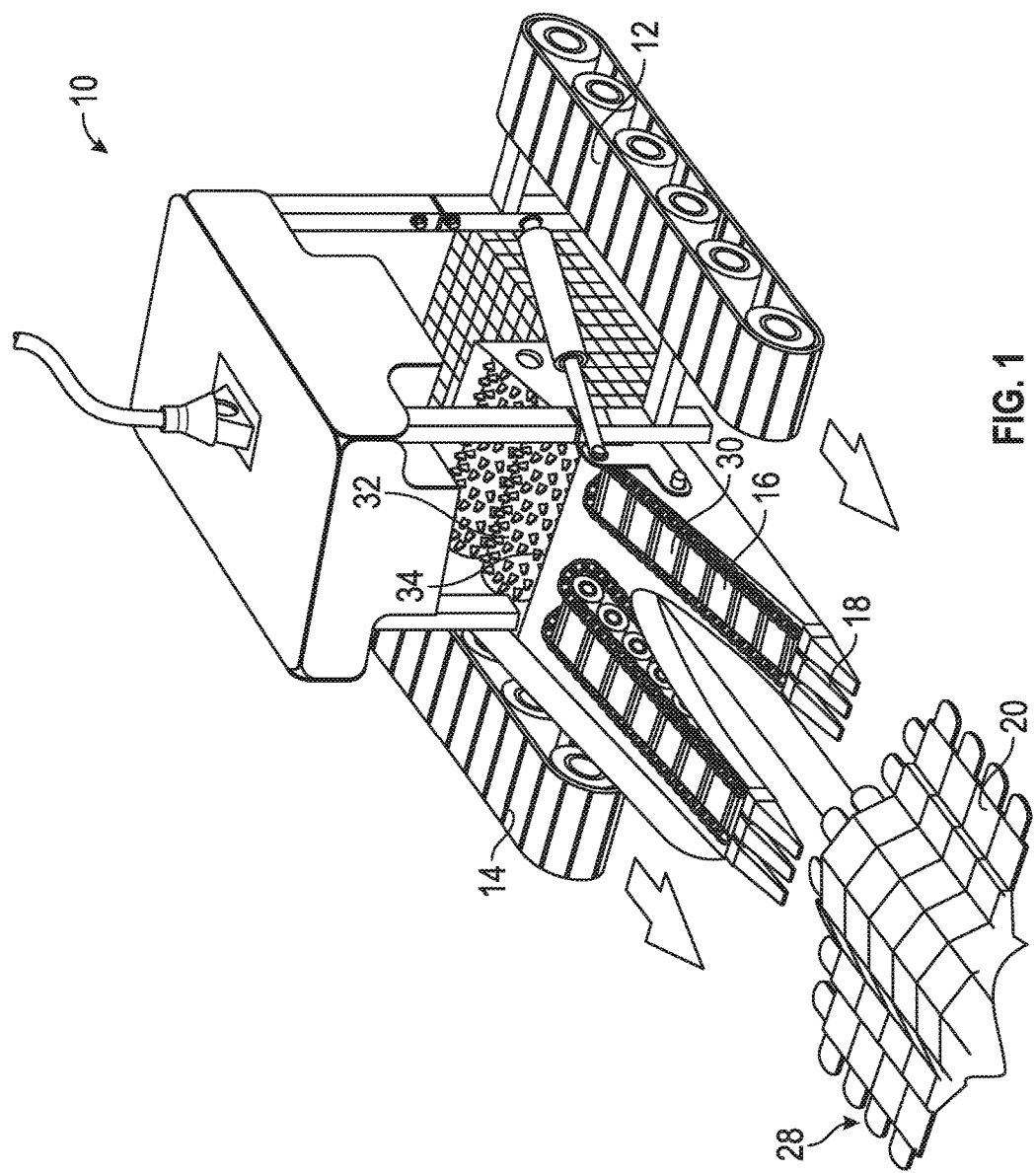
FIG. 1 shows a front perspective view of a vehicle.

The drawings described above and the written description of specific structures and functions below are presented for illustrative purposes and not to limit the scope of what has been invented or the scope of the appended claims. Nor are the drawings drawn to any particular scale or fabrication standards, or intended to serve as blueprints, manufacturing parts list, or the like. Rather, the drawings and written description are provided to teach any person skilled in the art to make and use the inventions for which patent protection is sought. Those skilled in the art will appreciate that not all features of a commercial embodiment of the inventions are described or shown for the sake of clarity and understanding.

Persons of skill in this art will also appreciate that the development of an actual, real-world commercial embodiment incorporating aspects of the inventions will require numerous implementation specific decisions to achieve the developer's ultimate goal for the commercial embodiment. Such implementation specific decisions may include, and likely are not limited to, compliance with system related, business related, government related and other constraints, which may vary by specific implementation, location and from time to time. While a developer's efforts might be complex and time consuming in an absolute sense, such efforts would nevertheless be a routine undertaking for those of skill in this art having the benefit of this disclosure.

It should also be understood that the embodiments disclosed and taught herein are susceptible to numerous and various modifications and alternative forms. Thus, the use of a singular term, such as, but not limited to, "a" and the like, is not intended as limiting of the number of items. Similarly, any relational terms, such as, but not limited to, "top," "bottom," "left," "right," "upper," "lower," "down," "up," "side," and the like, used in the written description are for clarity in specific reference to the drawings and are not intended to limit the scope of the invention or the appended claims.

The recovery vehicle and its method of use as described herein offer improvements on the existing methods in terms of the safety and may also provide better efficiency. Where the recovered mattresses are to be disposed of/recycled the proposed new method potentially offers a number of advantages and added value to the asset owner/operator and decommissioning contractor. For example, the recovery and processing activities may be performed at the seabed without human intervention, thus effectively eliminating the risk to divers. The processed material when recovered to the surface can be in a more manageable form when being offloaded from the vessel and disposed of on land, there is no further processing required prior to disposal unless the polypropylene rope is to be recovered. The recovery and processing can be combined and provide a more efficient process in terms of speed and the number of handling operations being significantly reduced over current methods. The reduction in recovery and processing times per mattress offers value to both client and contractor.

FIG. 1 shows a preferred embodiment of the vehicle. As shown, the vehicle 10 is disposed on a seabed 28. The treads 12, 14 are connected to the vehicle and allow for movement along the seabed 28. The lift assembly 16 is shown with fork lifts 18 connected that allow for engagement with concrete mattresses as will be discussed in greater detail below. This embodiment shows a digger chain assembly arrangement 30 on the lift assembly 16 in front of crushing rollers 32.

In a preferred use, the sea fastenings connecting a vessel to the vehicle 10 are released then vehicle 10 is launched. It is recommended that this launch occur at least about 50 m away from any subsea infrastructure. The vehicle 10 is lifted clear of the deck and the A-frame is boomed fully outboard. When instructed the vehicle is promptly lowered through the "splash zone" to approximately 5-10 m off the seabed. System checks are conducted once in water. When the tool is safely on the seabed, a full set of system checks are carried out to confirm the vehicle is ready for operation. On completion of these checks the tool is lifted 5-10 m off the seabed, the vessels moves to position the vehicle 10 ready to commence mattress recovery operations. Once on the seabed 28, the vehicle 10 moves to the start point as required.

Figure 2:
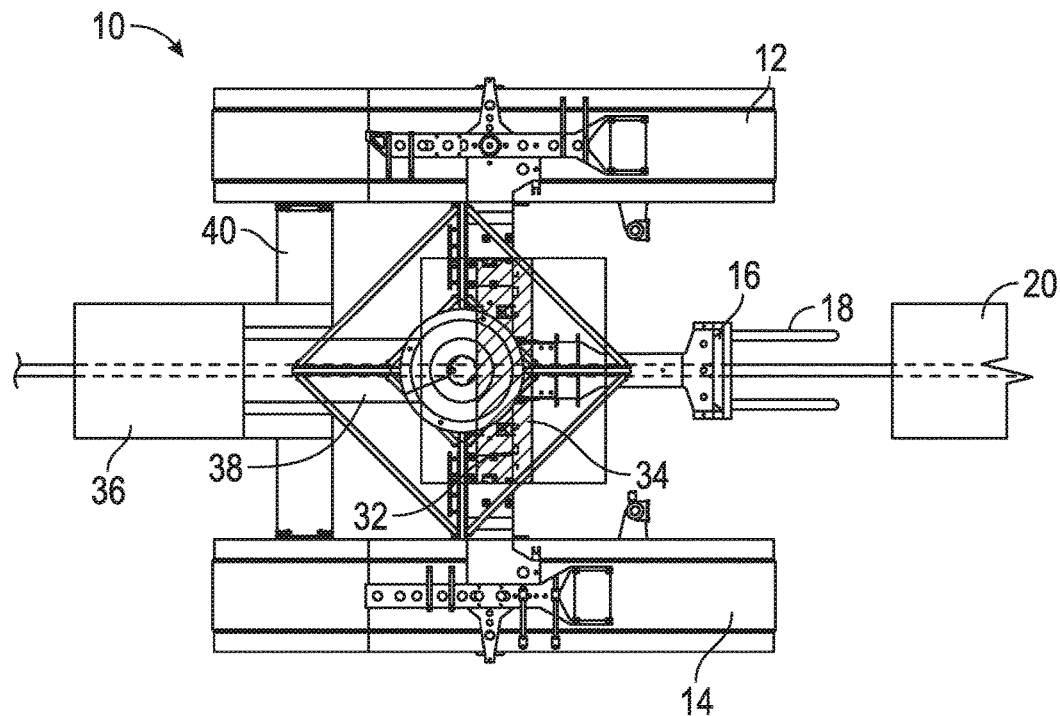
FIG. 2 shows an overhead view of a vehicle engaging a concrete mattress.
Figure 3:
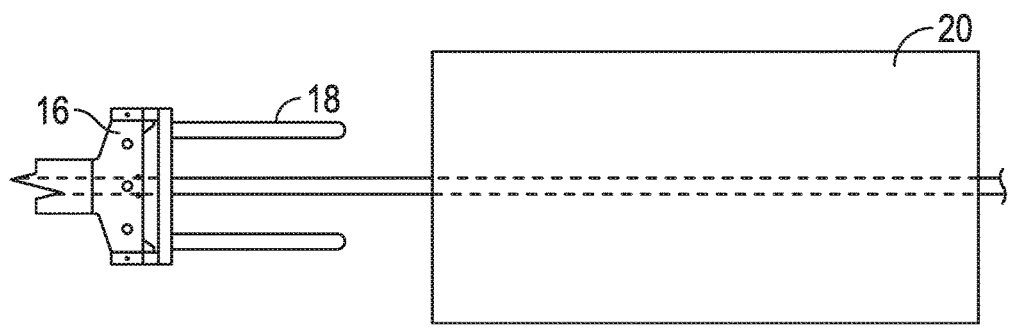
FIG. 3 shows an overhead view of a partial view of a vehicle engaging a concrete mattress.

As shown in FIG. 2, the loading process used on the vehicle 10 relies on a lift assembly 16 with preferably fork lifts 18 mounted to the front of the lift assembly 16. As the vehicle 10 is driven towards the mattress 20 for crushing and recovery, the fork lifts 18 at the front of the lift assembly 16 will be submerged into the seabed 28, beneath the concrete mattress 20. This lift assembly 16 may preferably be fitted with a digger chain assembly arrangement 30 with grabs which will engage the mattress 20 and draw it towards the subsea crushing rollers 32. FIG. 3 shows the fork lifts 18 of the lift assembly 16 engaging a mattress 20.

Figure 4:
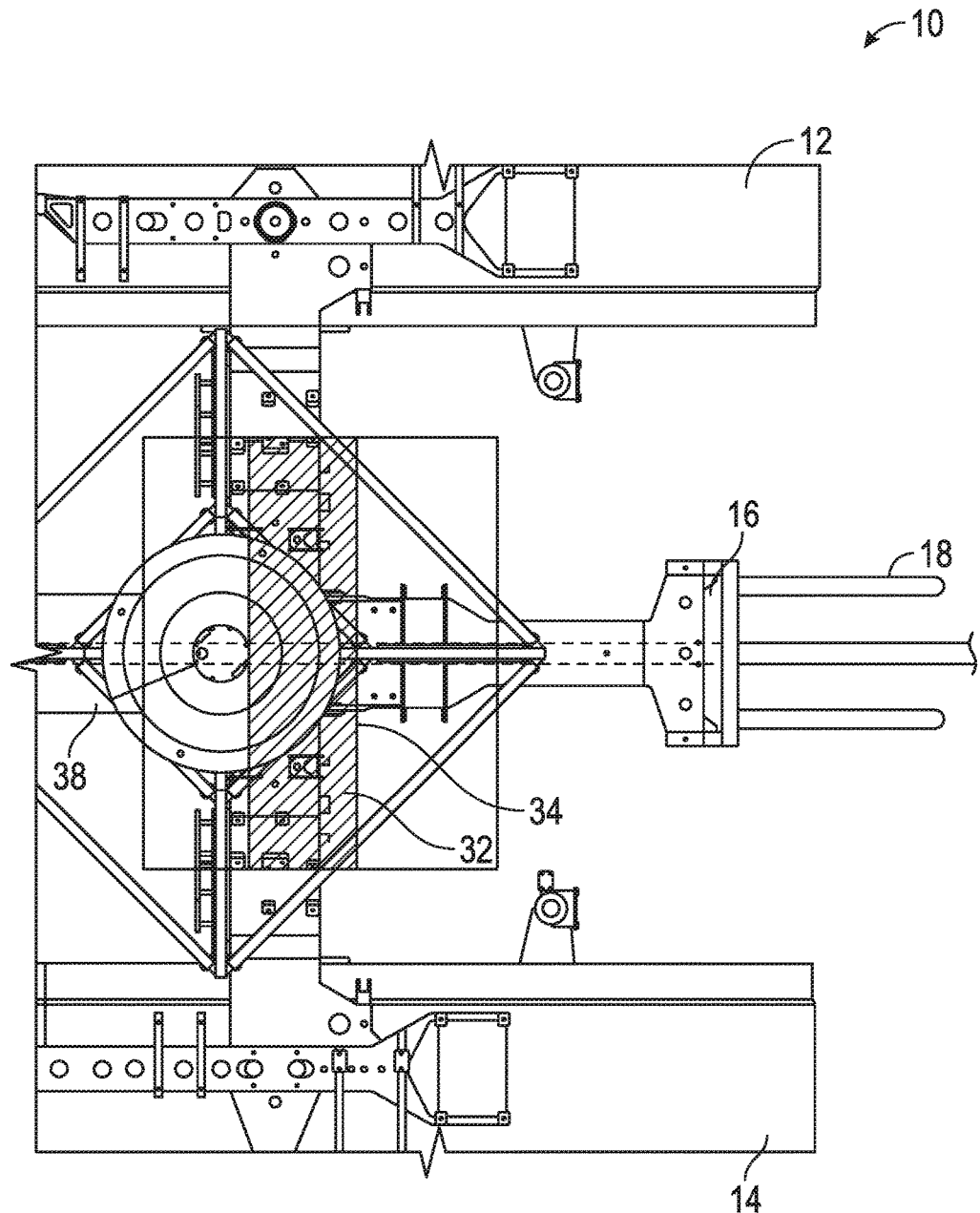
FIG. 4 shows an overhead view of a partial view of a vehicle capable of engaging a concrete mattress.

FIG. 4 shows a close up of where the mattress 20 is drawn into the mouth 34 of the subsea crushing rollers 32 using the digger chain assembly 30, the rollers 32 will crush the concrete mattresses 20 into aggregate, sized pieces called concrete mattress fragments preferably in accordance with client governed requirements. The digger chain assembly with grabs 30 will ensure that the mattress 20 is continually fed into the crushing rollers 32. The system is designed to allow for continuous mattress crushing operations, only pausing to change the rubble containers 36 when fully loaded. The vehicle operators may continually monitor the vehicle 10 forward speed, depending on the rate of crushing operations, ensuring optimal progress is maintained. It is estimated that a standard concrete mattress 20, which is typically about 6 m×about 3 m×about 0.3 m may be crushed in approximately 3 minutes from the instance of engagement with the crushing rollers 32. The crushing roller assembly 32 are preferably designed to ensure that all rubble is contained during crushing operations.

Figure 5:
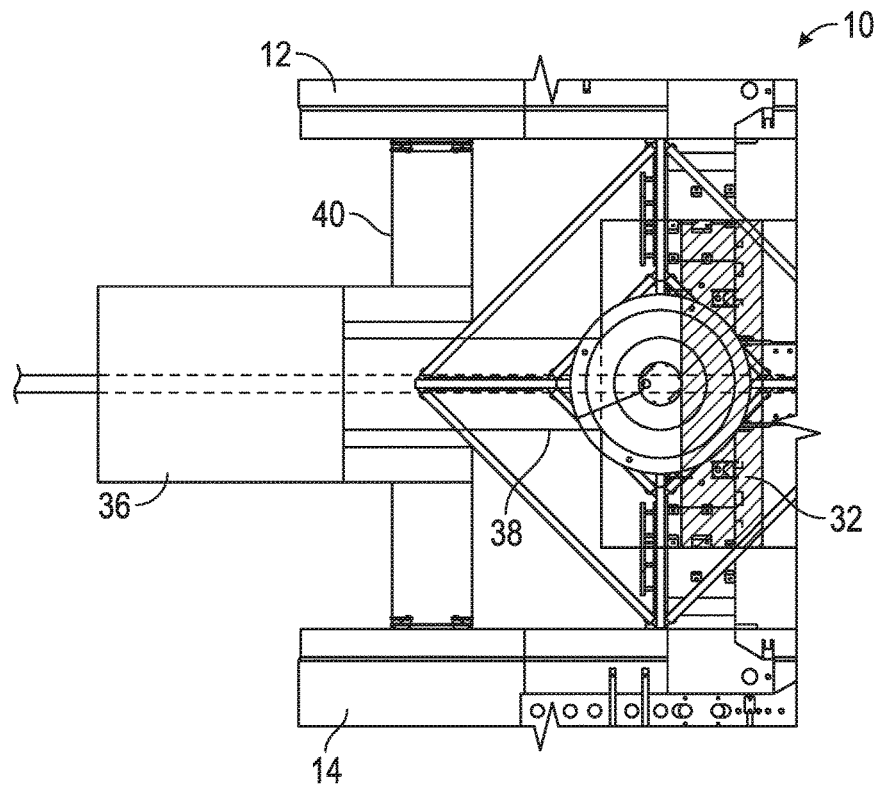
FIG. 5 shows a partial, overhead view of a vehicle capable of engaging a concrete mattress.
Figure 6:
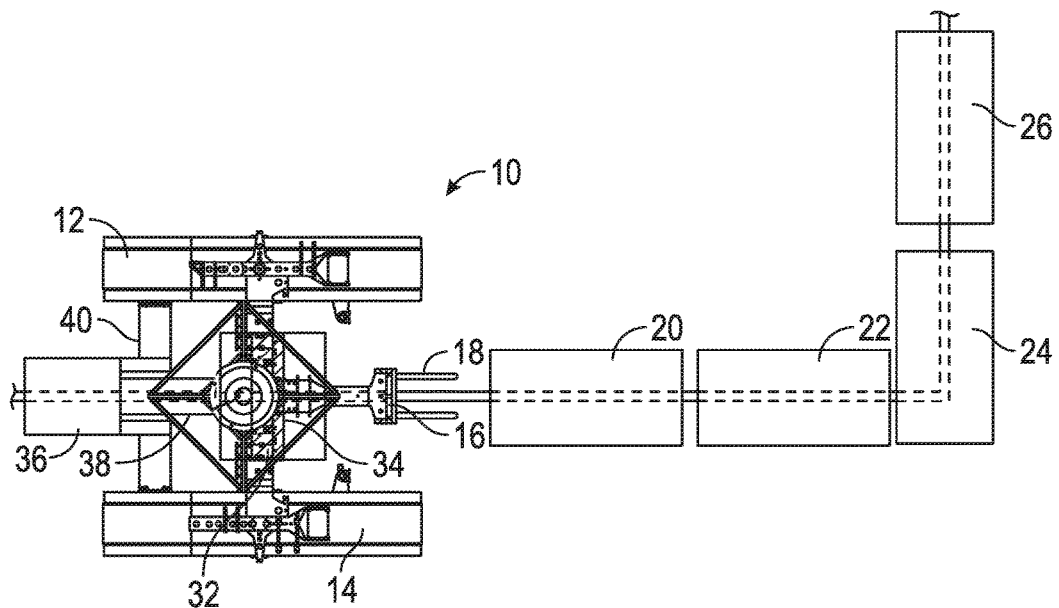
FIG. 6 shows an overhead view of a vehicle engaging a series of concrete mattresses.

As shown in FIG. 5, the crushed aggregate and rubble will leave the rear of the crushing rollers 32 and will be educted via an attached blow-out pipe 38 using water pumps to a purpose designed container at the rear of the vehicle 10. The rubble collection containers 36 are connected via an interface frame 40 and will be loaded within the vehicle 10 using the interface frame 40. The rubble collection containers 36 may be designed to separate the rubble and polypropylene ropes used to bind the concrete mattresses 20 using grillages to filter the material as it enters.

FIG. shows the vehicle 10 processes up to four concrete mattresses 20, 22, 24, and 26. While those skilled in the art will recognize that any number of concrete mattresses 20 may be processed with a vehicle 10 equipped with an appropriately sized rubble container 36, the preferred embodiment of the vehicle 10 is configured to accommodate the rubble of up to four mattresses 20, 22, 24, and 26. Once fully loaded with up to four standard concrete mattresses 20, 22, 24, and 26, the rubble collection container 36 can then be disengaged from interface frame 40 within the vehicle 10 and recovered using crane on a the vessel. The rubble containers 36 are preferably configured to be stackable as storage onboard a back deck of a vessels, allowing maximum mattress recovery per trip.

Once the fully loaded rubble container 36 has been recovered and safely secured to a deck such as the back deck of a vessel, an additional empty rubble container 36 can be deployed using the crane of the vessel and fitted within the interface frame 40, allowing mattress crushing operations to continue.

When the vessel reaches capacity for crushed mattresses 20, the vehicle 10 can be recovered to deck, and the vessel will depart the field to off-load the crushed rubble. This can be performed using a combination of the crane of the vessel and a shore-side crane to ensure efficient removal, minimizing On completion of mattress crushing and recovery operations or when the vessel has reached its rubble capacity, the vehicle 10 will be recovered to the deck. The vehicle 10 may cease all subsea crushing operations and the front fork 18 can be recovered from the seabed 28. Once the team and vessel are ready, the vehicle 10 can be lifted from the seabed 28, by any means including an umbilical winch, to between about 5 and about 10 m off the seabed 28. The vessel is then moved up to about 50 m away from any subsea infrastructure, prior to the vehicle 10 being recovered through the water column and "splash zone" and into to an A-frame snubber, where it is safely latched in. The A-frame is then boomed inboard and the vehicle is lowered, whilst remaining in the latches, to the deck using the telescopic snubber. Once on deck the vehicle is earthed and secured to the deck. vessel time away from the site.

The vehicle 10 may include powered track drive modules to propel the vehicle along the floor. The vehicle 10 may also contain a buoyancy power and communications module which is in communication with the armored lift, power, and telemetry umbilical.

The vehicle 10 is preferably connected mechanically, electrically, and optically to a floating surface vessel or platform via a cable. The recovery vehicle system may also include surface equipment for the provision of launch, recovery, electrical power supply, and remote control of the vehicle.

While the invention has been described with reference to one or more particular embodiments, those skilled in the art will recognize that many changes may be made thereto without departing from the spirit and scope of the description. Each of these embodiments and obvious variations thereof is contemplated as falling within the spirit and scope of the claimed invention.

What is claimed is:

1. A vehicle for use in subsea operations related to crushing a plurality of concrete mattresses comprising:
   a lift assembly;
   a crushing roller capable of crushing each concrete mattress into a plurality of concrete mattress fragments;
   at least one blow out pipe capable of blowing the concrete mattress fragments into a rubble container; and
   an interface frame capable of engaging the rubble container directly to the vehicle.

2. The vehicle of claim 1 further comprising a fork lift capable of being connected to the lift assembly.

3. The vehicle of claim 1 further comprising a digger chain assembly arrangement on the lift assembly.

4. The vehicle of claim 1 further comprising a plurality of treads.

5. The vehicle of claim 1 where the rubble container is detachable from the interface.

6. A method of crushing and collecting rubble of a plurality of concrete mattresses on a seabed in a subsea environment, the method comprising the steps of:
   (a) lowering a vehicle to the seabed;
   (b) lifting the concrete mattresses into the vehicle by using a lift assembly;
   (c) crushing the concrete mattresses into a plurality of concrete mattress fragments;
   (d) collecting the concrete mattress fragments in a first rubble container connected to the vehicle, where the vehicle further comprises an interface frame capable of engaging the rubble container directly to the vehicle.

7. The method of claim 6 further comprising the step of:
   (e) separating the first rubble container from the vehicle;
   (f) connecting a second rubble container to the vehicle.

8. The method of claim 6 wherein step (b) further comprises using a fork lift.

9. The method of claim 8 further comprising a digger chain assembly arrangement on the lift assembly.

10. The method of claim 6 further comprising a plurality of treads capable of moving the vehicle.

11. The method of claim 6 further comprising the step of lifting the vehicle from the seabed after use.

12. A vehicle for use in subsea environments comprising:
    a lift assembly;
    a fork lift capable of being connected to the lift assembly;
    a crushing roller;
    an interface connected to the vehicle;
    a rubble container; and
    an interface frame capable of engaging the rubble container directly to the vehicle.

13. The vehicle of claim 12 further comprising a digger chain assembly arrangement on the lift assembly.

* * * * *